A. N. PURCELL.
AUTOMATIC GARAGE JACK.
APPLICATION FILED MAR. 18, 1920.
1,356,011. Patented Oct. 19, 1920.
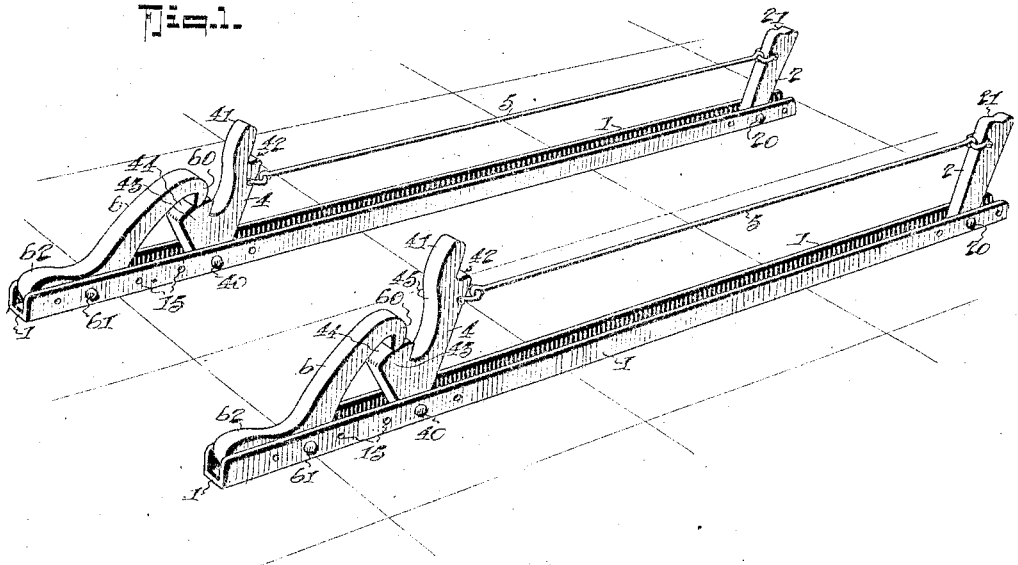
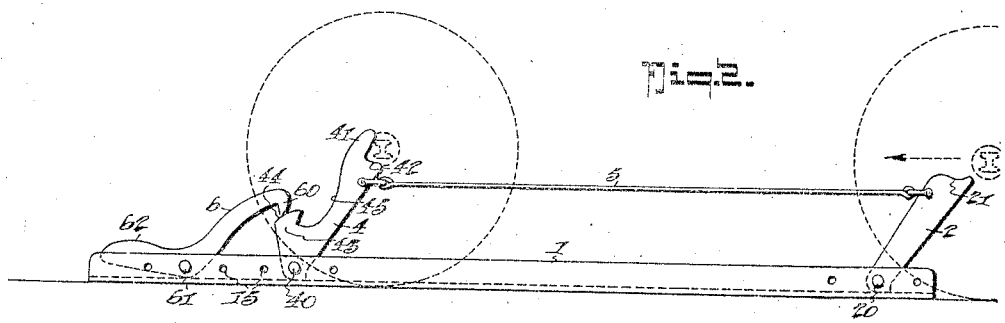
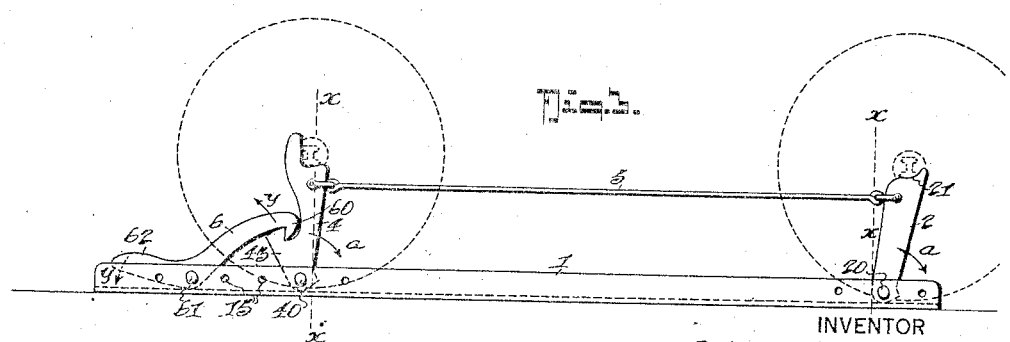
INVENTOR
Arthur N. Purcell.
BY
Fred J. Dieterich
ATTORNEYS

UNITED STATES PATENT OFFICE.

ARTHUR N. PURCELL, OF CORONA, NEW YORK.

AUTOMATIC GARAGE-JACK.

1,356,011.  Specification of Letters Patent.  Patented Oct. 19, 1920.

Application filed March 18, 1920. Serial No. 366,881.

*To all whom it may concern:*

Be it known that I, ARTHUR N. PURCELL, a citizen of the United States, residing at Corona, in the county of Queens and State of New York, have invented a new and Improved Automatic Garage-Jack, of which the following is a specification.

My invention has reference to jacks or like appliances for lifting automobiles and which are particularly adapted for use in garages for sustaining the automobile, with the tires, off of damp and oily floors and which are also used for holding the vehicle up for cleaning, repairing &c. on the tires and wheels and to thereby do away with the use of the ordinary hand jacks and extra labor.

In its more specific nature, my invention comprehends an improved jack of the general character stated in which the operation of lifting the vehicle and holding it to its lifted position is automatically effected as the vehicle, under its momentum, travels over and engages with the jack and in which the vehicle automatically rides off the jack, when the locking means, that automatically interlocks with the vehicle supports of the jack, is manually released.

With the above and other minor objects in view, that will hereinafter be explained, my invention consists of an automobile jack that embodies the peculiar features of construction and novel arrangement of the parts mentioned in the following detailed description, specifically stated in the appended claims and illustrated in the accompanying drawings, in which:

Figure 1 is a perspective view of my construction of jack, the lifter devices being at their down or normal position.

Fig. 2 is a side elevation thereof, the dash line indicating the height of the car axles as they travel toward the lifting levers.

Fig. 3 is a view similar to Fig. 2, the lifting levers and the detents being shown at the elevated position for holding the car up from the floor.

In the practical development of my invention, the same is made of two similarly constructed sections which are supported in parallel relation on the garage floor and secured thereto in any approved manner.

Each section embodies a base which may be and preferably is a U-shaped channel bar 1 spiked to the garage floor as indicated.

At the entrance end of each bar is mounted a supporting lever 2, the lower end of which is pivotally held on a cross pin 20 that extends transversely through the channel bar end, and the lower end of the said lever is so shaped that it operates as a stop for engaging the bottom of the bar 1 to hold the lever to its lowered or normal position and with its upper or axle bearing end in a plane below the height of the car axles while the car is traveling along the floor as indicated by the dotted and dash line 3 on Fig. 2.

The upper end of each of the levers 2 has a seat 21 which constitutes a bearing that moves up under the rear axle of the car as the said lever 2 is swung up by the impelling force of the front axle, when it engages a lifting lever 4 at the other or forward end of the bar 1, in the manner presently more fully explained.

Coöperative with each supporting lever 2 is a lifting lever 4 and the several pairs of levers 2—2 and 4—4 are so spaced apart that, when the car is driven onto the jack, the said levers 2 and 4 will be in proper position for seating the front and rear axles of the car, as is clearly indicated on Fig. 3 of the drawings.

Each lifting lever 4 is pivotally mounted on a cross pin 40, which pins 40 are mounted transversely in their respective base bars 1 and each of the levers 4 comprises a body portion that is connected by a cable or rod connection 5 with the upper end of the lever 2 at the opposite end of the base bar in which the said levers are mounted, such connection being provided so that the two levers swing up in unison, as the rear levers 4 are swung to the vertical position, in the manner presently stated.

Each lever 4 includes an upwardly extended abutment 41 that rises from the outer end of a seat 42, formed in the lever 4, and it is also formed with its forwardly extended heel 43 for coöperating with a gravity actuated detent or locking member 6.

The detent 6 includes a claw-like portion 60 that is so formed that it interlocks with the heel 43 of its adjacent lever 4, when the latter is swung up to the vertical position shown in Fig. 3.

The locking detent 6 is pivotally mounted, as at 61, in the channel bar 1 some distance forward of the adjacent lever 4 and its outermost end terminates in a heel portion 62 that projects above the top of the base bar 1, when the said detent 6 is locked in engagement with the lever 4, as shown in Fig. 3.

To cause the claw-like portion 60 of the detents 6, to interlock with and disengage the heel member 40 of their respective levers 4, the front edges of said levers 4 are curved, as at 45, and their heel members 43 have bearing surfaces 44 that incline forwardly and downwardly when the said levers 4 are at their substantially vertical position shown in Fig. 3, and the said surfaces 44 form supports for the claw-like portion 60 of the member 6 when the said levers 4 are at the rearwardly inclined or normal position, as shown in Figs. 1 and 2.

It should be stated that the pivotal connections that join the levers 2 and 4 with the ground or base bar 1, are such that, when the said levers are raised to their vertical position and are engaged by the front and back axles of the car, they are at a slight angle to the vertical, as indicated by the broken lines $x$—$x$, the reason for which will presently appear.

From the foregoing taken in connection with the drawings, the complete construction, the manner of its use and the advantages of my invention will be readily apparent to those familiar with the use of mechanisms of this kind.

By referring more particularly to Fig. 2, in which the parts are at the normal or down position, when the car is driven in the garage, the front axle will pass over the top of levers 2 and, under the car's momentum, the front axle will engage the upper abutments or extensions 41 of the levers 4—4 and thereby swing up the said levers 4—4 and, through the flexible connections, cause the other levers 2—2 to swing toward the vertical position and to engage with the rear axle, it being understood that the impact of the front axles causes the levers 2 and 4 to further swing upwardly and, in doing so, lifts the car so as to raise the tires from the floor, as indicated on Fig. 3.

As the levers 4—4 are swung upwardly as stated, the claw ends of the detents 6—6 ride over the respective inclined faces of the heels of the levers 4 until they come over the notched ways on the forward edges of the said lever 4 and thus allow the claw ends of the detents to drop into position and interlock with the heel 43 of the levers 4 and thereby hold the parts, with the car, at the lifted position, as shown in Fig. 3.

To remove the car from the jack, it is only necessary to step onto the upwardly projected heels of the locking levers or detents 6 (see arrows $y$—$y$ on Fig. 3), to lift the claws 60 out of engagement with the locking heels of their respective levers 4—4 and, as the said levers are thus released, the weight of the car will cause the levers 2 and 4 to drop down (see the arrows $a$—$a$ on Fig. 3).

The slight angles at which the levers are set, when at their elevated position, facilitates the drop of the said lever and the lowering of the wheels and tires back onto the floor.

The jack can be readily adjusted in length to suit different car bases by adjustably shifting the pivots for the levers 2 along the series of apertures 15 in the channel or base bars 1.

What I claim is:

1. In an automobile jack mechanism, a pair of parallel base members, a front supporting lever and a rear supporting lever, the said levers being pivotally connected at their lower end to each base member to swing in the vertical plane, a connection for each pair of front and rear levers to cause the levers to move in the same direction and in unison, the pivotal connection of the front levers being such whereby to limit the upward swing of such levers and the rear levers to cause them to assume a forwardly inclined position when at their vehicle supporting position, each rear lever having a locking heel and gravity actuating detents adapted for engaging with the heels of their respective rear levers, the said detents being pivotally mounted on their respective base members and provided with heel portions that project above the said base members as the detents drop into interlocked engagement with the rear levers, whereby pressure on the said heel portions lifts the detents out of locked engagement with the rear levers to permit the vehicle to drift back off of the jack onto the floor.

2. In an automobile jack mechanism, a suitable supporting base, a pair of front axle supporting levers, and a pair of rear axle supporting levers, the said levers being pivotally connected at their lower end to the base to swing in the vertical plane, a connection for each pair of front and rear levers to cause said levers to move in the same direction, and in unison, the pivotal connection of the front levers being such whereby to limit the upward swing of such levers and the rear levers to cause them to assume a backwardly inclined position, when at the vehicle supporting position and detent devices mounted on the base adapted for interlocking and engaging the rear levers and holding them to their elevated position.

ARTHUR N. PURCELL.